(12) United States Patent
Ge et al.

(10) Patent No.: US 10,958,204 B1
(45) Date of Patent: Mar. 23, 2021

(54) AUTOMOTIVE ELECTRIC DRIVE SYSTEMS WITH INTERLEAVED VARIABLE VOLTAGE CONVERTERS

(71) Applicant: Ford Global Technologies, LLC, Dearborn, MI (US)

(72) Inventors: Baoming Ge, Okemos, MI (US); Lihua Chen, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/660,465

(22) Filed: Oct. 22, 2019

(51) Int. Cl.
  *H02P 27/06* (2006.01)
  *H02M 3/158* (2006.01)
  *H01F 27/28* (2006.01)
  *B60L 50/60* (2019.01)
  *B60K 6/28* (2007.10)

(52) U.S. Cl.
  CPC ............ *H02P 27/06* (2013.01); *B60L 50/60* (2019.02); *H01F 27/28* (2013.01); *H02M 3/158* (2013.01); *B60K 6/28* (2013.01); *B60L 2210/10* (2013.01); *B60Y 2200/91* (2013.01); *B60Y 2200/92* (2013.01); *B60Y 2400/61* (2013.01); *H02P 2201/03* (2013.01)

(58) Field of Classification Search
  USPC ..... 318/400.01, 400.02, 700, 701, 722, 599, 318/800, 801, 430, 432
  See application file for complete search history.

(56) References Cited

U.S. PATENT DOCUMENTS

| 6,205,035 | B1* | 3/2001 | Vollmer | ............ H02M 3/33584 363/17 |
| 7,821,799 | B2* | 10/2010 | Jacobs | .................... H02M 1/14 363/47 |
| 10,056,187 | B2* | 8/2018 | Lee | ..................... H02M 3/1584 |
| 10,116,249 | B2 | 10/2018 | Zou et al. | |
| 10,189,357 | B2 | 1/2019 | Zou et al. | |
| 2018/0354372 | A1 | 12/2018 | Yang et al. | |

* cited by examiner

*Primary Examiner* — Antony M Paul
(74) *Attorney, Agent, or Firm* — David B. Kelley; Brooks Kushman P.C.

(57) ABSTRACT

A bi-directional variable voltage converter transfers power between a traction battery and an electric machine inverter. The bi-directional variable voltage converter includes a capacitor, two power module phase legs, and an air-gapped transformer with three windings and no more than four terminals. A first of the windings defines a first terminal and a second terminal of the no more than four terminals. The first terminal is directly electrically connected with a positive terminal of the traction battery and the second terminal is directly electrically connected with a positive terminal of the capacitor and a junction between the second and third windings. A second of the windings defines a third terminal of the no more than four terminals directly electrically connected with one of the power module phase legs. A third of the windings defines a fourth terminal of the no more than four terminals directly electrically connected with the other of the power module phase legs.

15 Claims, 6 Drawing Sheets

AUTOMOTIVE ELECTRIC DRIVE SYSTEMS WITH INTERLEAVED VARIABLE VOLTAGE CONVERTERS

TECHNICAL FIELD

This disclosure relates to automotive power electronic systems.

BACKGROUND

Electrified vehicles, including hybrid, plug-in hybrid, and electric vehicles, are designed to be propelled or partially propelled by one or several electric machines, such as AC induction machines, DC brushless electric machines, and permanent magnetic synchronous machines. A battery pack is included in the electrified vehicles to provide electricity to the electric machines. Hybrid and plug-in hybrid vehicles may also have built-in internal combustion engines, which are able to charge the battery pack and/or propel the electrified vehicle. The battery pack includes multiple battery cells in series and/or in parallel to achieve high voltage and/or high output power to meet the requirements of the electric machines. The battery pack also provides power to other equipment and circuits, such as the DC-DC converter, on-board generator, and air conditioning system.

SUMMARY

An automotive electric drive system includes a traction battery, an electric machine inverter, and a bi-directional variable voltage converter that transfers power between the traction battery and electric machine inverter. The bi-directional variable voltage converter includes a capacitor, two power module phase legs, and an air-gapped transformer with three windings and no more than four terminals. A first of the windings defines a first terminal and a second terminal of the no more than four terminals. The first terminal is directly electrically connected with a positive terminal of the traction battery and the second terminal is directly electrically connected with a positive terminal of the capacitor and a junction between the second and third windings. A second of the windings defines a third terminal of the no more than four terminals directly electrically connected with one of the power module phase legs, and a third of the windings defines a fourth terminal of the no more than four terminals directly electrically connected with the other of the power module phase legs.

An automotive electric drive system includes a traction battery, an electric machine inverter, and a bi-directional variable voltage converter that transfers power between the traction battery and electric machine inverter. The bi-directional variable voltage converter includes a capacitor, two power module phase legs, and an air-gapped transformer with three cores and three windings. A first of the windings is wound around only a first of the cores. A second and third of the windings are each wound around the first of the cores and a second of the cores. A third of the cores disposed between the first and second of the cores does not have any of the windings wound therearound.

An automotive electric drive system includes a traction battery, an electric machine inverter, and a bi-directional variable voltage converter that transfers power between the traction battery and electric machine inverter. The bi-directional variable voltage converter includes a capacitor, two power module phase legs, and an air-gapped transformer with three cores and three windings. A first of the windings is wound around only a first of the cores. A second and third of the windings are each wound around only a second of the cores. The first and second of the cores are directly adjacent to one another, and a third of the cores does not have any of the windings wound therearound.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Variable voltage converters (VVC) are usually applied to Hybrid Electric Vehicles (HEV) and Electric Vehicles (EV). Performance of the traction motor drive is enhanced by the VVC's boost ability, which steps up DC bus voltage from a low battery voltage and ensures a desired DC bus voltage regardless of the power the motor/generator drive is consuming or generating. For high power/high current VVCs, multiphase legs are in parallel to extend VVC current rating.

Figure 1:
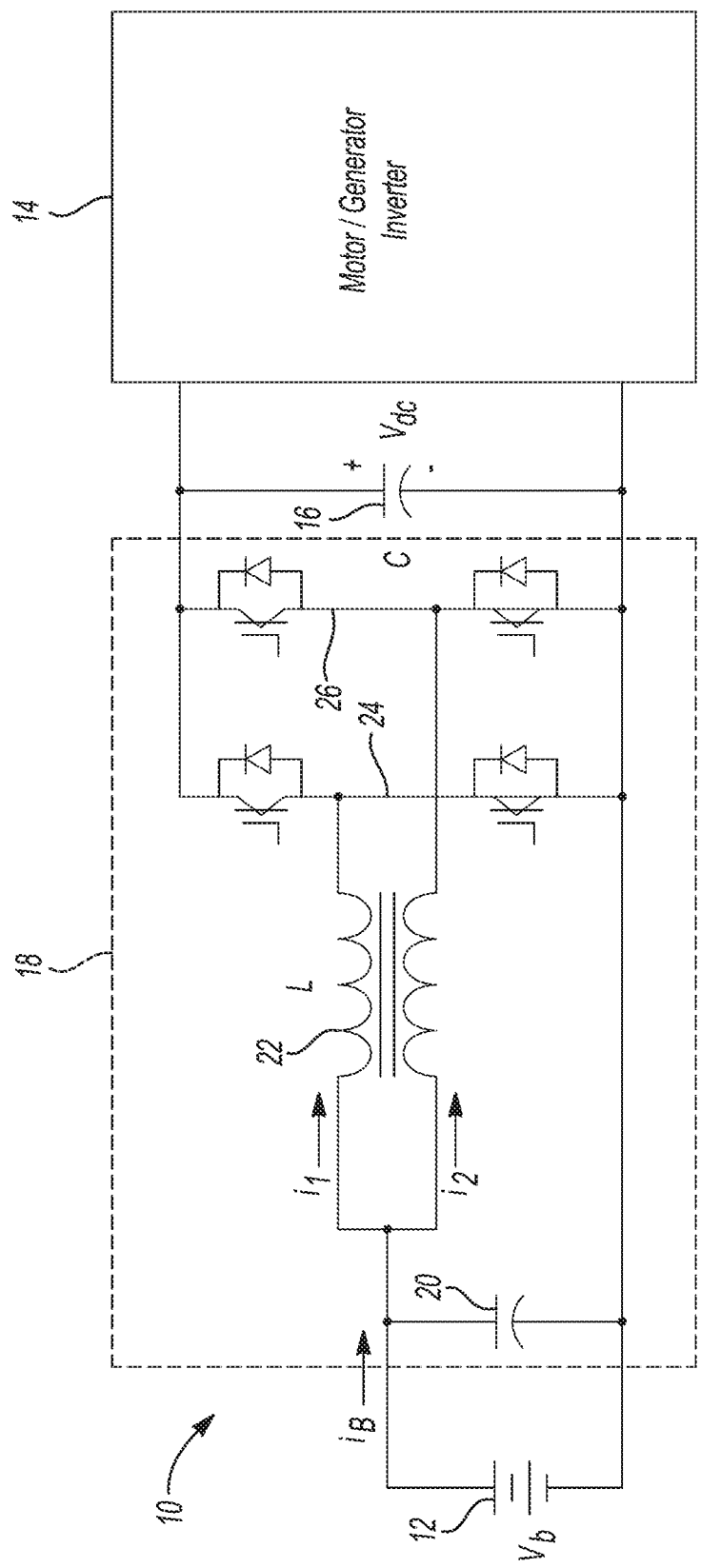
FIG. 1 is a schematic diagram of a portion of an automotive electric drive system that includes a typical interleaved variable voltage converter.

FIG. 1 shows an automotive electric drive system 10 including a traction battery 12, a motor/generator inverter 14, a DC-link capacitor 16, and a two-phase interleaved VVC 18 connected between the traction battery 12 and DC-link capacitor 16. The two-phase interleaved VVC 18 includes an input capacitor 20, coupled inductor 22, and phase legs 24, 26. The coupled inductor 22 and input capacitor 20 work together to limit battery current ripple within a required range. For high power VVCs, large inductors and capacitors are usually necessary to achieve this purpose. As a result, designed high power VVCs may have a high volume, high weight, high cost, and high loss, which reduces electric-drive system value. Moreover, cooling and packaging large inductors and capacitors can be challenging.

In addition, internal resistance and stray inductance of a traction battery may affect battery ripple current in existing VVCs. A traction battery may have large resistance (e.g., 0.7Ω at −40° C.) at low temperature, but quite low resistance (e.g., 0.025Ω at 70° C.) at high temperature. When a coupled inductor and input capacitor are designed for an existing VVC to meet battery ripple current requirements at low temperature, the designed inductor and input capacitor may not meet battery ripple current requirements at high temperature. When a coupled inductor and input capacitor are designed for an existing VVC to meet battery ripple current requirements at high temperature, the designed inductor and input capacitor may have large size.

The question thus remains regarding how to design a high-power interleaved VVC with a small inductor and small capacitor. In the meantime, battery ripple current should be maintained at a low level regardless of battery internal impedance.

Here, VVCs are proposed to address the issues above. Such VVCs may reduce inductance and capacitance when compared with existing solutions. Moreover, battery ripple current is always quite low even though battery internal impedance may change in a wide range, which shows a robust performance against battery internal impedance change.

Figure 2:
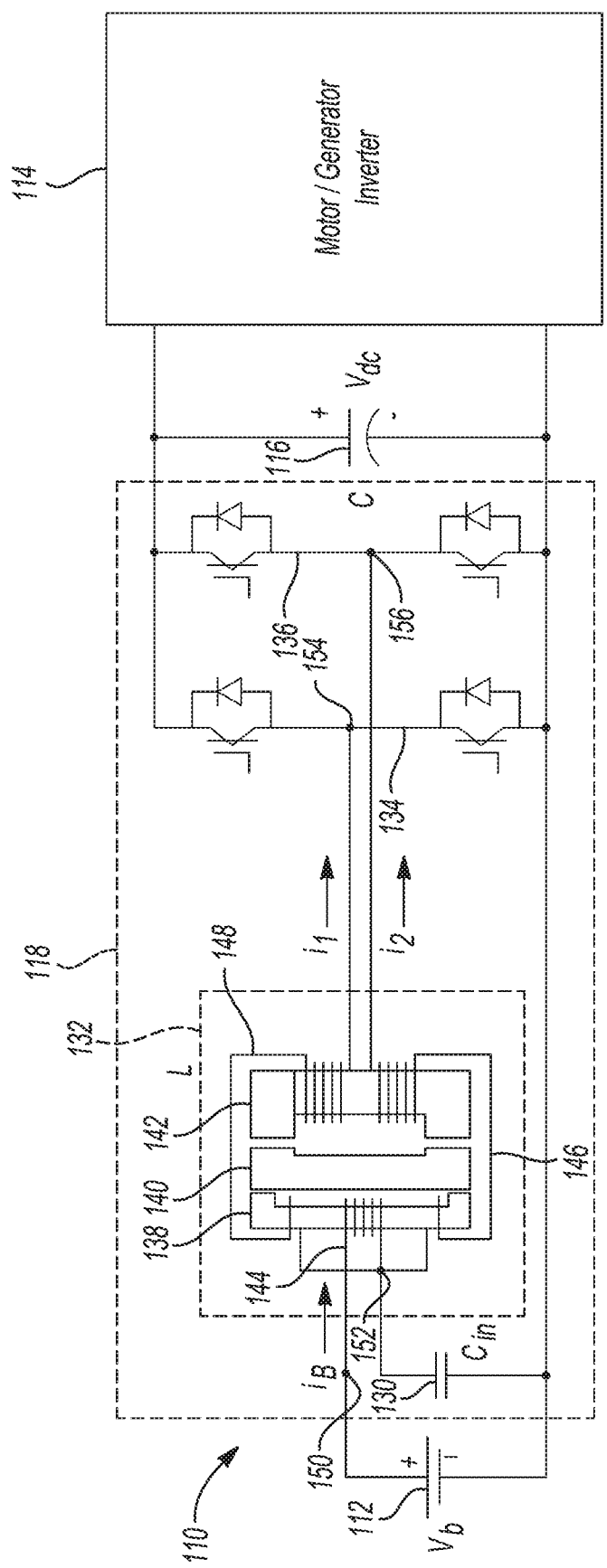
FIG. 2 is a schematic diagram of a portion of an automotive electric drive system that includes a proposed interleaved variable voltage converter.
Figure 3:
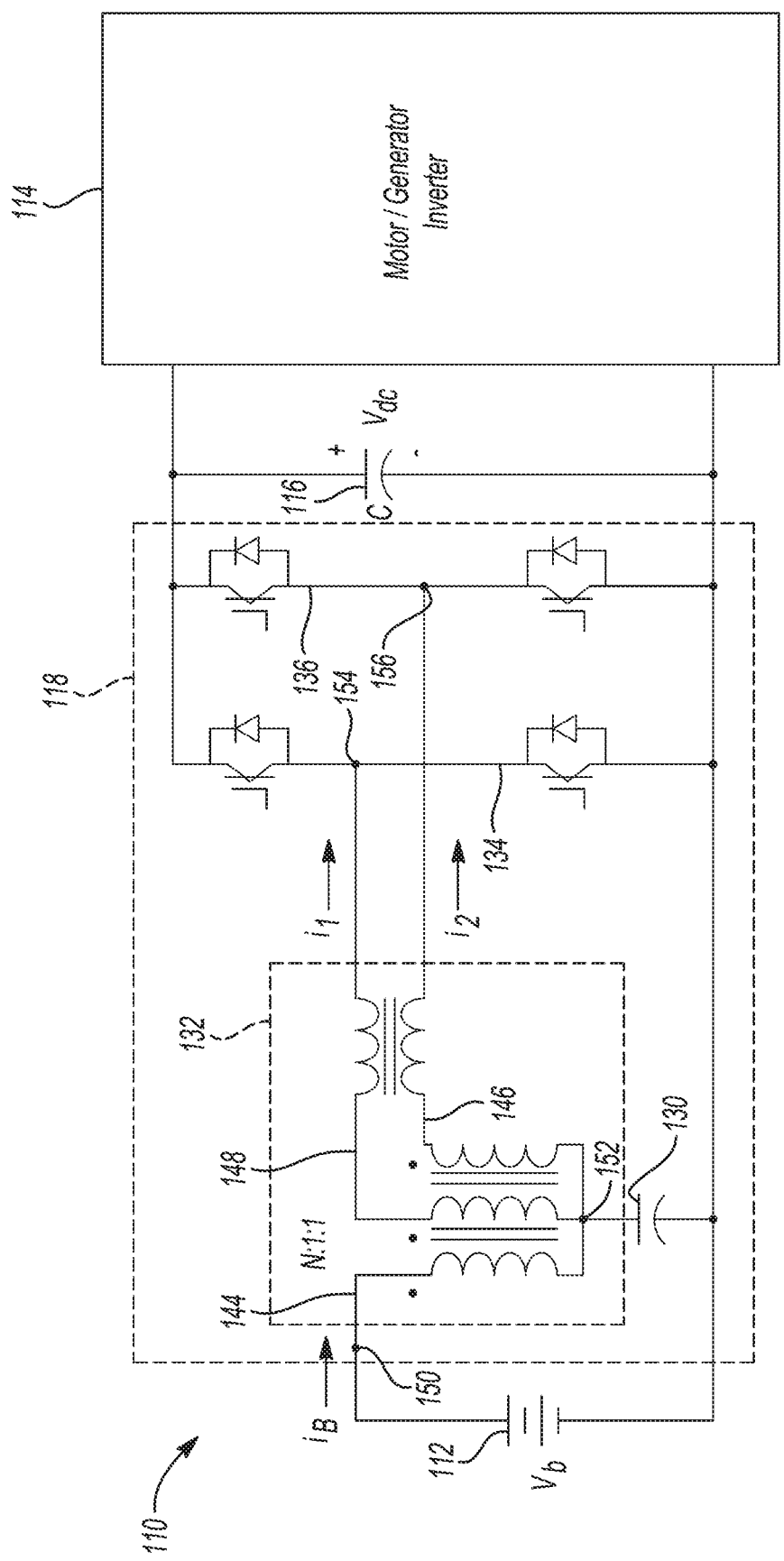
FIG. 3 is schematic diagram of the portion of the automotive electric drive system of FIG. 2 with an equivalent circuit diagram of the interleaved variable voltage converter.

FIGS. 2 and 3 show an automotive electric drive system 110 including a traction battery 112, a motor/generator inverter 114, a DC-link capacitor 116, and a two-phase interleaved VVC 118 connected between the traction battery 112 and DC-link capacitor 116. The two-phase interleaved VVC 118 includes an input capacitor 130, air-gapped transformer 132, and phase legs 134, 136. The air-gapped transformer 132 includes three cores 138, 140, 142, three windings 144, 146, 148, and four terminals 150, 152, 154, 156.

The winding 144 is wound only around the core 138. The windings 146, 148 are each wound around the core 138 and the core 142. The core 140 is disposed between the cores 138, 142 and does not have any of the windings 144, 146, 148 wound therearound.

The winding 144 defines the terminals 150, 152. The winding 146 defines the terminal 156. The winding 148 defines the terminal 154. The terminal 150 is directly electrically connected with a positive terminal of the traction battery 112. The terminal 152 is directly electrically connected with a positive terminal of the input capacitor 130 and a junction of the windings 146, 148. The terminal 154 is directly electrically connected with the phase leg 134. The terminal 156 is directly electrically connected with the phase leg 136.

The windings 144, 146, 148 on the core 138 have a turns ratio of N:1:1. The windings 146, 148 on core 142 are coupled. The core 140 provides a common magnetic path. Battery ripple current $\Delta i_B$ has the following relationship with current ripples $\Delta i_1$ and $\Delta i_2$ of two phase legs:

$$\Delta i_B = \frac{\Delta i_1 + \Delta i_2}{N} - \Delta i_m \quad (1)$$

where $\Delta i_m$ is the magnetization current ripple, which does not flow into the traction battery 112. When a large magnetization inductance is designed, $\Delta i_m$ is negligible and thus $$\Delta i_B = \frac{\Delta i_1 + \Delta i_2}{N} \quad (2)$$

When a small magnetization inductance is designed, $\Delta i_B$ is far less than $(\Delta i_1 + \Delta i_2)/N$.

Figure 4:
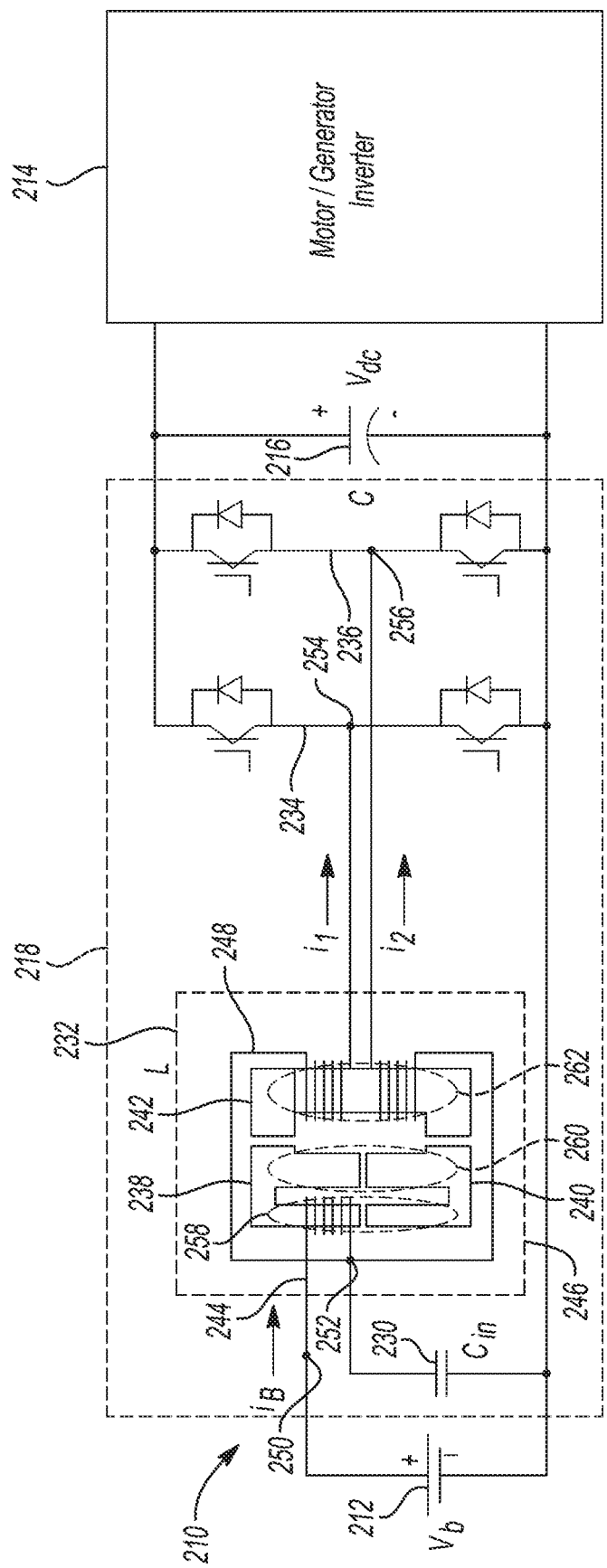
FIG. 4 is a schematic diagram of a portion of an automotive electric drive system that includes another proposed interleaved variable voltage converter.

FIG. 4 shows an automotive electric drive system 210 including a traction battery 212, a motor/generator inverter 214, a DC-link capacitor 216, and a two-phase interleaved VVC 218 connected between the traction battery 212 and DC-link capacitor 216. The two-phase interleaved VVC 218 includes an input capacitor 230, air-gapped transformer 232, and phase legs 234, 236. The air-gapped transformer 232 includes three cores 238, 240, 242, three windings 244, 246, 248, and four terminals 250, 252, 254, 256. The cores 238, 240 collectively define core legs 258, 260. The core 242 defines core leg 262.

The winding 244 is wound only around the core 238. The windings 246, 248 are each wound only around the core 242. The cores 238, 242 are disposed directly adjacent to one another. The core 240 does not have any of the windings 244, 246, 248 wound therearound.

The winding 244 defines the terminals 250, 252. The winding 246 defines the terminal 256. The winding 248 defines the terminal 254. The terminal 250 is directly electrically connected with a positive terminal of the traction battery 212. The terminal 252 is directly electrically connected with a positive terminal of the input capacitor 230 and a junction of the windings 246, 248. The terminal 254 is directly electrically connected with the phase leg 234. The terminal 256 is directly electrically connected with the phase leg 236.

The core legs 258, 262 are designed to have much larger reluctance than the core leg 260. When $R_{m1}$, $R_{m2}$, and $R_{m3}$ are the reluctances of the core legs 258, 262, 260, respectively, battery current ripple $\Delta i_B$ will be $$\Delta i_B = \frac{N_2 R_{m3}}{N_1 (R_{m2} + R_{m3})} (\Delta i_1 + \Delta i_2) - \Delta i_m \quad (3)$$

where $\Delta i_m$ is the magnetization current ripple, which does not flow into the traction battery 212; $N_1$ is the turn number of the winding 244; $N_2$ is the turn number of the windings 246, 248. $N_1$ is far less than $N_2$ to lower transformer weight. When designing the transformer 232, the following relationships are observed:

$$\frac{N_2 R_{m3}}{N_1 (R_{m2} + R_{m3})} = \frac{1}{N} \quad (4)$$

and $$R_{m2} = \left(\frac{N \cdot N_2}{N_1} - 1\right) R_{m3} \quad (5)$$

Battery current ripple $\Delta i_B$ is thus limited to $(\Delta i_1 + \Delta i_2)/N$.

The arrangements contemplated herein keep battery ripple current low even with a small inductance associated with the transformer and a small input capacitor. Moreover, battery ripple current is less affected by battery internal impedance. Therefore, battery temperature-related internal impedance considerations may be less relevant.

Simulation was used here to compare the proposed VVC designs with existing solutions. The following assumptions were made. Traction battery voltage is 200 V. Battery internal impedance has three cases: 1) stray inductance $L_b = 3$ μH, internal resistance $R_b = 0.2$ Ω; 2) stray inductance $L_b = 3$ μH, internal resistance $R_b = 0.025$ Ω; 3) stray inductance $L_b = 0$ μH, internal resistance $R_b = 0.025$ Ω. Both VVCs with duty cycle of 0.75 drive 100 kW load. L is equal to 50 μH. $C_{in}$ is equal to 50 μF. N is equal to 6.

Figure 5:
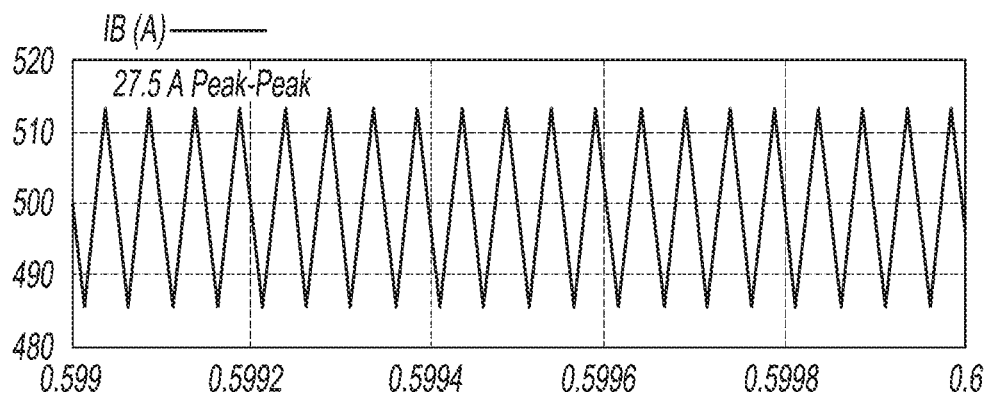
FIG. 5 is a plot of is versus time for the interleaved variable voltage converter of FIGS. 2 and 4 at a stray inductance of 3 pH and internal resistance $R_b$=0.2Ω.
Figure 6:
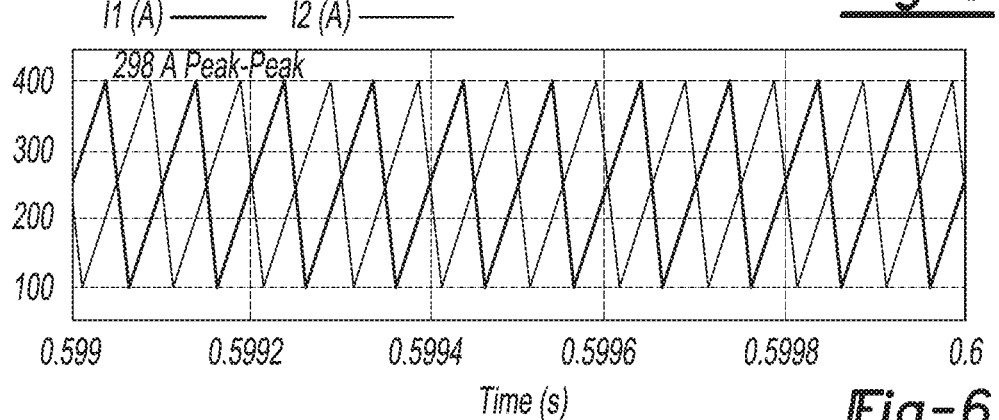
FIG. 6 is a plot of $i_1$ and $i_2$ versus time for the interleaved variable voltage converter of FIGS. 2 and 4 at a stray inductance of 3 μH and internal resistance $R_b$=0.2Ω.
Figure 7:
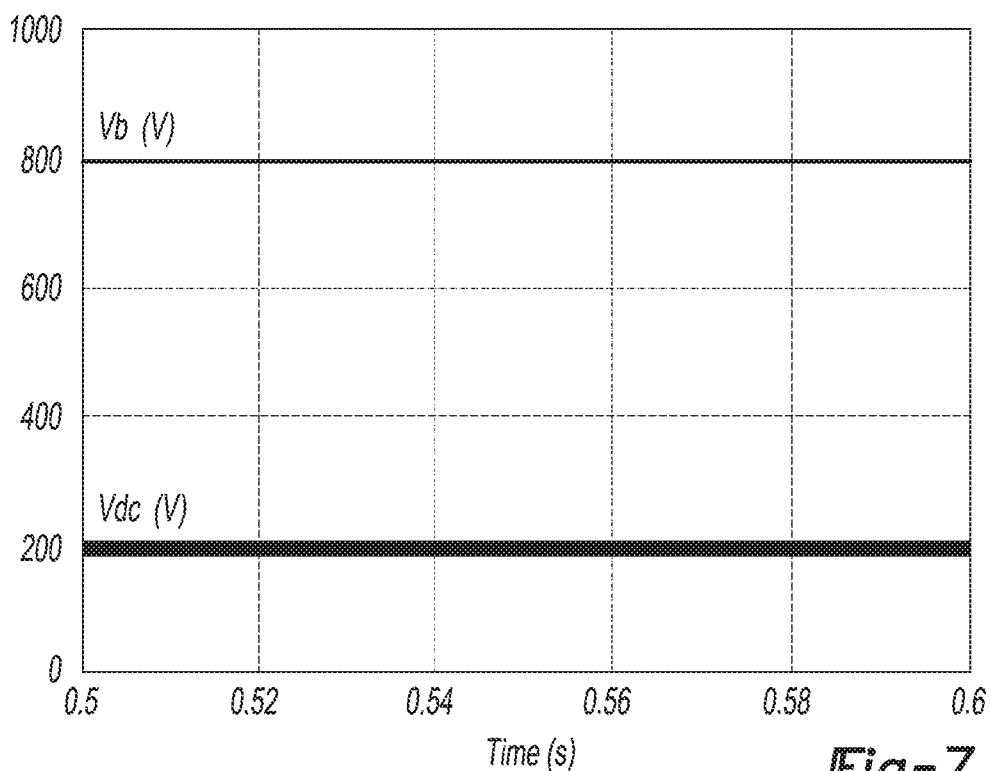
FIG. 7 is a plot of $V_b$ and $V_{dc}$ versus time for the interleaved variable voltage converter of FIGS. 2 and 4 at a stray inductance of 3 μH and internal resistance $R_b$=0.2Ω.

FIGS. 4, 5, and 6 show simulation results for case 1. Battery ripple current is in the range of 27.5 A peak-peak. DC bus voltage is boosted to 800 V from 200 V battery voltage. Battery average current is 500 A and each winding connected to a phase leg carries 250 A. This shows two features: 1) the required inductance and capacitance are quite small to achieve low battery ripple current; 2) Battery ripple current is less affected by battery internal impedance. Case 2 and case 3 were also examined. For case 2, battery ripple current is in the range of 27.5 A peak-peak. For case 3, battery ripple current is in the range of 29.3 A peak-peak.

Figure 8:
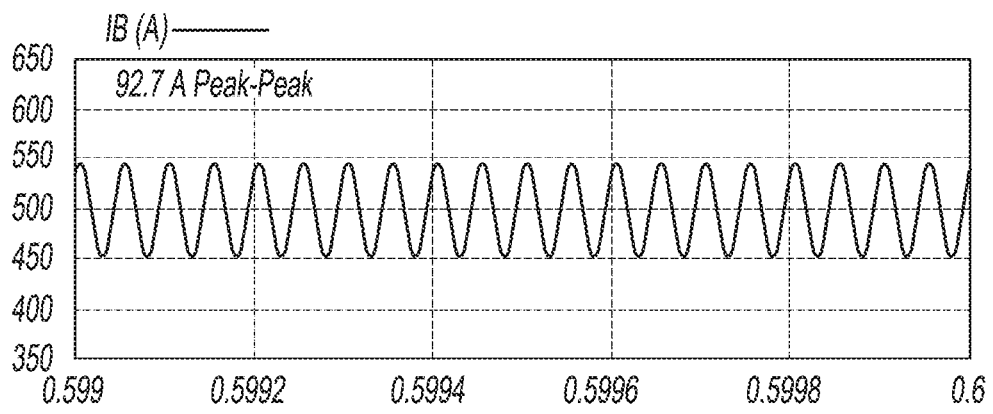
FIG. 8 is a plot of is versus time for the interleaved variable voltage converter of FIG. 1 at a stray inductance of 3 μH and internal resistance $R_b$=0.2Ω.
Figure 9:
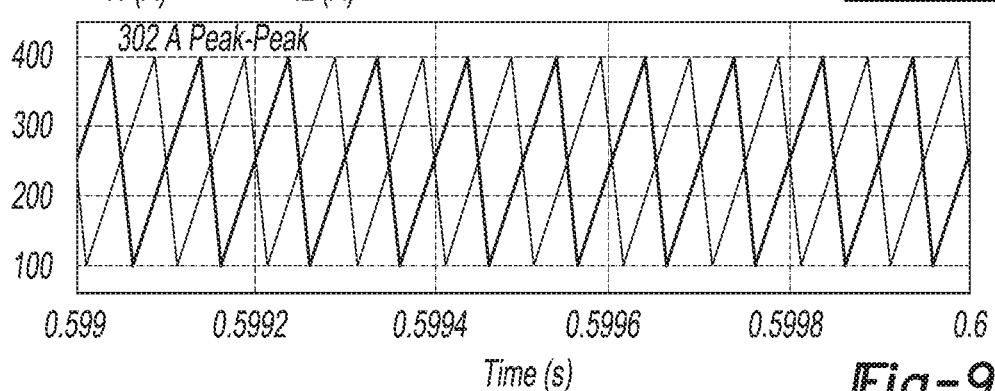
FIG. 9 is a plot of $i_1$ and $i_2$ versus time for the interleaved variable voltage converter of FIG. 1 at a stray inductance of 3 μH and internal resistance $R_b$=0.2Ω.
Figure 10:
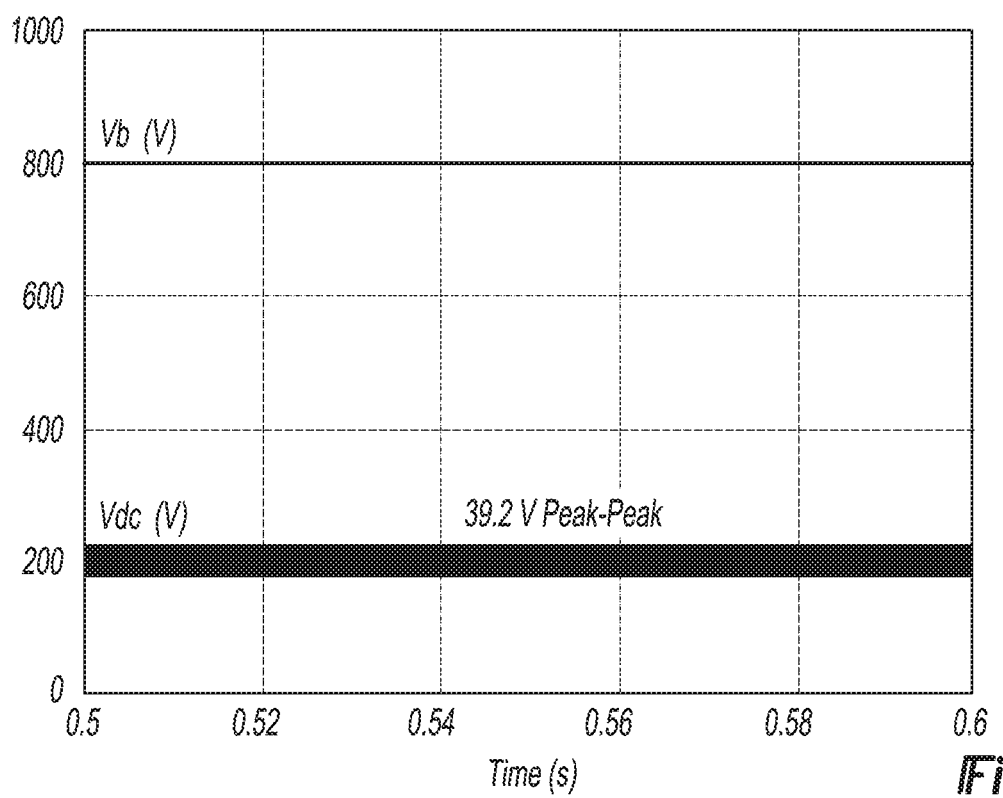
FIG. 10 is a plot of $V_b$ and $V_{dc}$ versus time for the interleaved variable voltage converter of FIG. 1 at a stray inductance of 3 μH and internal resistance $R_b$=0.2Ω.

The same battery impedance cases were used when simulating the arrangement of FIG. 1. Again, L is equal to 50 μH, and $C_{in}$ is equal to 50 μF. FIGS. 8, 9, and 10 show simulation results for case 1. Battery ripple current is in the range of 92.7 A peak-peak. DC bus voltage is boosted to 800 V from 200 V battery voltage, with a 39.2V peak-peak. For case 2, battery ripple current is in the range of 129 A peak-peak. For case 3, battery ripple current is in the range of 183.7 A peak-peak. Thus, battery ripple current is quite high and significantly affected by battery internal impedance.

A much large inductor is expected in the arrangement of FIG. 1 to lower battery current ripple and voltage ripple. Actual design examples are shown in Table 1 to compare the proposed VVCs to the existing VVC of FIG. 1. To achieve the same amplitude of battery ripple current, the existing VVC of FIG. 1 requires larger inductance. Moreover, the proposed VVCs have significantly lower weight as compared with the existing VVC of FIG. 1.

switches to achieve a two-phase interleaved VVC. The battery ripple current is quite low. However, existing VVC needs a large two-windings coupled inductor and a large input capacitor to achieve a two-phase interleaved VVC. Battery ripple current of the proposed VVCs is less affected by battery internal impedance, but that of the existing VVCs is significantly affected by battery internal impedance.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive electric drive system comprising:
   a traction battery;
   an electric machine inverter; and
   a bi-directional variable voltage converter configured to transfer power between the traction battery and electric machine inverter, and including a capacitor, two power module phase legs, and an air-gapped transformer with three windings and no more than four terminals, wherein a first of the windings defines a first terminal and a second terminal of the no more than four terminals, wherein the first terminal is directly electrically connected with a positive terminal of the traction battery and the second terminal is directly electrically connected with a positive terminal of the capacitor and a junction between the second and third windings, wherein a second of the windings defines a third terminal of the no more than four terminals directly

TABLE 1

Performance Comparison of Arrangement of FIG. 1 to Arrangements of FIGS. 2 and 4

| Battery Impedance | Required Inductance (μH) | | Battery Current Ripple (A peak-peak) | | Inductor Weight (kg) | | Note |
|---|---|---|---|---|---|---|---|
| | Existing | Proposed | Existing | Proposed | Existing | Proposed | |
| $L_b = 3$ μH, $R_b = 0.2$ Ω | 160 μH | 50 μH | 27.6A | 27.5 A | 3.3 kg | 1.6 kg | Battery average current: 500 A |
| $L_b = 3$ μH, $R_b = 0.025$ Ω | 219 μH | 50 μH | 27.5 A | 27.5 A | 4.3 kg | | Each phase leg current: 250 A |
| $L_b = 0$ μH, $R_b = 0.025$ Ω | 310 μH | 50 μH | 29.6 A | 29.3 A | 6.1 kg | | |

Some of the proposed VVCs require a small three-windings transformer, a small capacitor, and four active electrically connected with one of the power module phase legs, and a third of the windings defines a fourth terminal of the no more than four terminals directly electrically connected with the other of the power module phase legs.

2. The automotive electric drive system of claim 1, wherein the air-gapped transformer includes three cores and wherein each of three windings is wound around a same one of the cores.

3. The automotive electric drive system of claim 1, wherein the air-gapped transformer includes three cores and wherein the second and third of the windings are each wound around a same two of the cores.

4. The automotive electric drive system of claim 1, wherein the air-gapped transformer includes three cores and wherein the second and third of the windings are each wound around only one of the cores.

5. The automotive electric drive system of claim 4, wherein the one of the cores is disposed between the other two of the cores.

6. The automotive electric drive system of claim 1, wherein the air-gapped transformer includes three cores and wherein one of the cores does not have any of the three windings wound therearound.

7. The automotive electric drive system of claim 1, wherein the air-gapped transformer includes three cores and wherein the first of the windings is wound around only one of the cores.

8. An automotive electric drive system comprising:
a traction battery;
an electric machine inverter; and
a bi-directional variable voltage converter configured to transfer power between the traction battery and electric machine inverter, and including a capacitor, two power module phase legs, and an air-gapped transformer with three cores and three windings, wherein a first of the windings is wound around only a first of the cores, wherein a second and third of the windings are each wound around the first of the cores and a second of the cores, and a third of the cores disposed between the first and second of the cores does not have any of the windings wound therearound.

9. The automotive electric drive system of claim 8, wherein the air-gapped transformer includes no more than four terminals, wherein the first of the windings defines a first terminal and a second terminal of the no more than four terminals, and wherein the first terminal is directly electrically connected with a positive terminal of the traction battery.

10. The automotive electric drive system of claim 9, wherein the second terminal is directly electrically connected with a positive terminal of the capacitor and a junction between the second and third windings.

11. The automotive electric drive system of claim 8, wherein the air-gapped transformer includes no more than four terminals, wherein the second of the windings defines a third terminal of the no more than four terminals directly electrically connected with one of the power module phase legs, and wherein the third of the windings defines a fourth terminal of the no more than four terminals directly electrically connected with the other of the power module phase legs.

12. An automotive electric drive system comprising:
a traction battery;
an electric machine inverter; and
a bi-directional variable voltage converter configured to transfer power between the traction battery and electric machine inverter, and including a capacitor, two power module phase legs, and an air-gapped transformer with three cores and three windings, wherein a first of the windings is wound around only a first of the cores, wherein a second and third of the windings are each wound around only a second of the cores, wherein the first and second of the cores are directly adjacent to one another, and wherein a third of the cores does not have any of the windings wound therearound.

13. The automotive electric drive system of claim 12, wherein the air-gapped transformer includes no more than four terminals, wherein the first of the windings defines a first terminal and a second terminal of the no more than four terminals, and wherein the first terminal is directly electrically connected with a positive terminal of the traction battery.

14. The automotive electric drive system of claim 13, wherein the second terminal is directly electrically connected with a positive terminal of the capacitor and a junction between the second and third windings.

15. The automotive electric drive system of claim 12, wherein the air-gapped transformer includes no more than four terminals, wherein the second of the windings defines a third terminal of the no more than four terminals directly electrically connected with one of the power module phase legs, and wherein the third of the windings defines a fourth terminal of the no more than four terminals directly electrically connected with the other of the power module phase legs.

* * * * *